March 18, 1969  J. U. BERKL  3,433,931
GAGE CALIBRATOR
Filed June 16, 1966
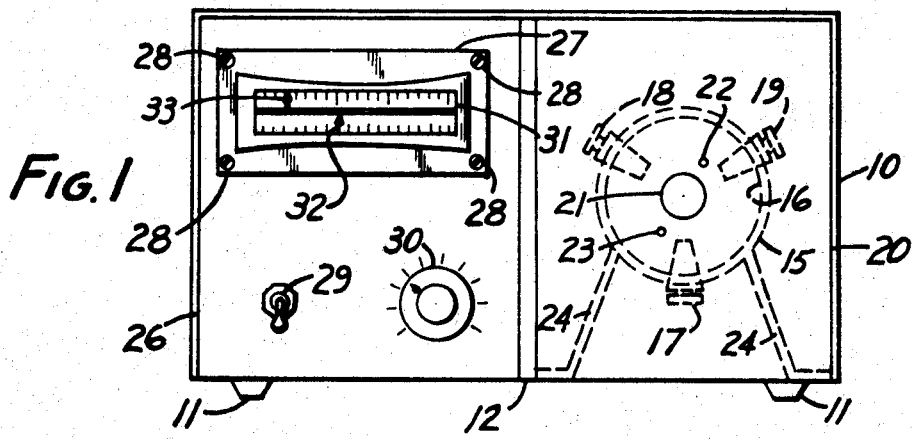
Fig. 1
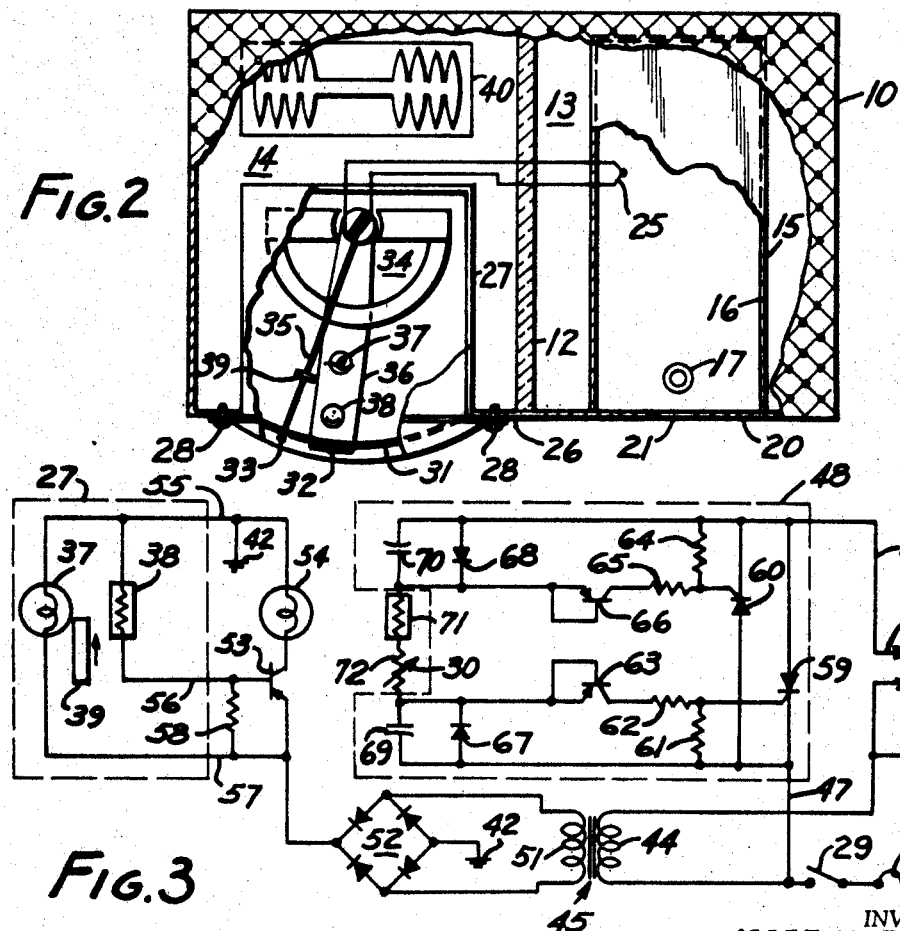
Fig. 2
Fig. 3
INVENTOR.
JOSEF U. BERKL
BY
ATTORNEYS.

United States Patent Office 3,433,931
Patented Mar. 18, 1969

3,433,931
GAGE CALIBRATOR
Josef U. Berkl, West Los Angeles, Calif., assignor to Hi-Shear Corporation, Torrance, Calif., a corporation of California
Filed June 16, 1966, Ser. No. 558,112
U.S. Cl. 219—502  6 Claims
Int. Cl. G01k *15/00;* H05b *1/02*

ABSTRACT OF THE DISCLOSURE

This disclosure relates to gage calibrators wherein temperature gages to be calibrated are inserted into a furnace. The temperature of the furnace is indicated by the position of a meter needle and is maintained at the desired temperature by heating means in the furnace controlled by a power control circuit. Manually adjustable mounting means is provided for selecting the desired furnace temperature and detector means is mounted to the mounting means for detecting the position of the meter needle when the needle indicates that the temperature of the furnace is at the desired value. Bias means, comprising a variable resistor in the power control circuit, is controlled by the detector means to control the control circuit which in turn operates on the heating means to maintain the furnace at the predetermined temperature.

This invention relates to gage calibrators.

Calibration of temperature gages is customarily performed with the use of molten salt baths, utilizing a process which requires 12 to 24 hours. When using a salt bath to calibrate a temperature gage, the gage sensor is inserted in a large tank containing a molten salt bath. The salt bath in the tank is heated to a predetermined and known temperature, and the gage reading is calibrated so that, with the calibration, the gage reading will be the same as the known bath temperature. The process involved in using a salt bath generally requires about 12 hours to heat the bath to predetermined temperatures, and 12 additional hours to calibrate the gage. Calibration is checked at several temperatures, requiring the temperature of the salt bath to be changed. Such extended periods of time for calibrating a gage are not desirable since the calibration of one gage will tie-up the use of the salt bath for 12 to 24 hours, and will remove the gage from service for a like period. Thus, the machinery for which the gage is intended to monitor must either be shut down for this extended period or a replacement gage be installed. In either case, there is a deterimental expense involved in shutting down a machine or in maintaining and installing and removing temporary gages.

It is an object of the present invention to provide a reliable gage calibrator for calibrating temperature gages in a relatively short period of time.

A gage calibrator according to the present invention includes a furnace area, means forming an opening in said furnace area adpated to receive a gage to be calibrated, means for heating said furnace area, and a means for indicating the temperature of said furnace area whereby the temperature of the furnace area and the temperature indicated by the gage may be compared.

The above and other features of this invention will be fully understood from the following detailed description and the accompanying drawings, in which:

FIG. 1 is a front view of the gage calibrator of the present invention;

FIG. 2 is a partially cut-away top view of the gage calibrator of FIG. 1; and

FIG. 3 is a circuit diagram of the gage calibrator of FIGS. 1 and 2.

Referring to FIGS. 1 and 2, there is shown a gage calibrator having a casing 10 supported by feet 11. The casing is divided into two chambers 13 and 14 by an asbestos or other suitable heating insulating barrier 12.

A furnace 15, having an inner reflective surface 16, is located within chamber 13. A plurality of infrared lamps 17, 18 and 19 are situated around the periphery of the furnace 15. Although three infrared heating lamps are shown, any number of lamps may be used as desired. The front of chamber 13 is closed with a suitable front plate 20 which seals with the furnace 15, closing same. Front plate 20 carries a suitable opening 21 for inserting the sensor of a gage to be calibrated. Mounting holes 22 and 23 are provided for mounting a gage, and may be threaded so the gage can be mounted with a pair of machine screws. The furnace is firmly mounted within chamber 13 by a suitable bracket 24.

A sensor device, such as thermocouple 25, is connected within the furnace 15 for sensing the temperature therein. Any suitable thermal sensing device, such as a thermistor, may be used instead of thermocouple 25.

Front plate 26 closes the front of chamber 14. A meter unit 27 is suitably mounted, such as by screws 28, on the front plate 26. Also mounted on front plate 26 is a switch 29 and a power controller 30. Meter 27 has a face plate 31 calibrated in appropriate units, such as Fahrenheit degrees. A first settable needle 32 is provided for indicating the desired temperature within the furnace 15, and a second readout needle 33 is provided for indicating the actual temperature within the furnace 15.

As shown in FIG. 2, meter 27 is a galvanometer having a D'Arsonval movement 34. Needle 33 is connected to arm 35 which forms part of the movement 34. Movement 34 is operated by power generated by the thermocouple 25 so that arm 35 moves to the right in the drawing as the temperature within the furnace increases. Plate 36 carries needle 32, and is movable about the same axis as arm 35. The position of plate 36 is adjusted manually.

Mounted in spaced relation on plate 36 is a lamp 37 and a light detector 38. The light detector 38 may be a suitable light-dependent resistor whose resistance is inversely proportional to the luminar intensity which impinges upon it. A flag 39 is carried on arm 35 in such a manner that as arm 35 parallels plate 36, flag 39 cuts off the light between lamp 37 and light detector 38. A suitable meter 27, including needles 32 and 33, movement 34, flag 39, and plate 36 carrying lamp 37 and light detector 38, is manufactured by West Instrument Corporation, a subsidiary of Gulton Industries, Inc., 3816 North River Road, Schiller Park, Ill.; as their model number JSCR.

A heat sink 40 is located within chamber 14 for the control circuit to prevent overheating of the circuitry. The bulk of the circuit shown in FIG. 3 is mounted on heat sink 40.

Referring to FIG. 3, a plug 41 connects to a standard 60 cycle, 110 volt alternating current supply. Plug 41 is preferably grounded as shown at 42. One side of plug 41 is connected to a first terminal 43 and to one side of primary winding 44 of transformer 45. The opposite side of plug 41 is connected through a suitable fuse 46 to the switch 29. The opposite side of switch 29 connects to the opposite side of primary winding 44 and to a lead 47. Lead 47 connects to a phase-type SCR power control circuit 48. Lead 49 connects terminal 50 to the power control circuit 48.

The secondary winding 51 of transformer 45 is connected to a diode bridge 52. Diode bridge 52 is grounded at its negative side at 42 and its positive side is connected to the emitter of PNP transistor 53. A source of physical energy such as lamp 54 comprises the load for transistor 53, and is connected between ground 42 and the collector of transistor 53.

The lamp 37 and light detecting resistor 38 of the meter 27 are connected together and to ground by lead 55. The undergrounded side of the light detector 38 is connected to the base of transistor 53 by a lead 56, while the ungrounded side of lamp 37 is connected to the emitter of transistor 53 by lead 57. A resistor 58 is connected between leads 56 and 57.

The power control circuit generally comprises a first silicon controlled rectifier (SCR) 59 having its anode connected to lead 49 and its cathode connected to lead 47, and a second SCR 60 having its anode connected to lead 47 and its cathode connected to lead 49. The gate of SCR 59 is connected through a resistor 61 to lead 47 and through resistor 62 to the collector of PNP transistor 63. In a similar manner, the gate electrode of SCR 60 is connected through a resistor 64 to lead 49 and through resistor 65 to the collector of PNP transistor 66. The base of transistor 63 is connected directly to the emitter of transistor 63, and the base of transistor 66 is connected directly to the emitter of transistor 66. A diode 67 has its anode connected to lead 47 and its cathode to the base and emitter of transistor 63, while a diode 68 is connected having its anode connected to lead 49 and its cathode connected to the emitter and base of transistor 66. A capacitor 69 is connected in parallel with diode 67, and a capacitor 70 is connected in parallel with diode 68. A suitable detector such as light-dependent resistor 71 responsive to energy generated by lamp 54 and an adjustable resistor 72 are serially connected between capacitors 69 and 70. Resistor 72 is adjusted by the power regulator 30. Light-dependent resistors 38 and 71 each have a resistance value which continuously varies over a range and is dependent on the quantity of impinging light radiation.

The infrared lamps 17, 18 and 19 are connected in parallel across terminals 43 and 50.

The operation of the power control circuit 48 is as follows: The resistance of resistor 72 is set to a preselected value by power regulator 30. Assuming lamp 54 to be initially on, the light-dependent resistor 71 is initially at a low value. Assuming further that the sine wave voltage of the alternating current on line 47 is, at a particular instant, slightly positive and becoming more positive, diode 67 conducts placing the voltage across resistors 71 and 72 and charging capacitor 69. As the voltage becomes more positive on its sine wave, transistor 66 conducts and provides a gate voltage to the gate electrode of silicon controlled rectifier 60. The SCR 60 then conducts causing the remainder of the positive part of the sine wave to be conducted through line 47, SCR 60 and line 49 to the infrared lamps across terminals 43 and 50. Likewise for each negative side of the sine wave, diode 68 conducts and resistors 71 and 72 control the conduction of transistor 63 which, in turn, controls the conduction of silicon controlled rectifier 59. As the resistance of resistor 71 or 72 increases, whether by decreasing the light from lamp 54 or increasing the resistance of 72 by regulating the power regulator 30, the conduction of the silicon controlled rectifiers 59 and 60 is decreased to a shorter portion of each half of the sine wave due to the greater bias on transistors 63 and 66. The power applied to the lamps 17–19 is dependent on the period of time that the SCRs conduct, which, in turn, is proportional to the combined resistance of resistors 71 and 72.

In practice, a gage to be calibrated is inserted within the furnace 15 through the opening 21 and is mounted flush against the front plate 20 by mounting holes 22 and 23. Plate 36 in meter 27 is moved to a desired scale reading determined by needle 32. The heat intensity of the infrared lamps is then set by power regulator 30, adjusting the value of resistor 72 to a predetermined value. When switch 29 is closed, the power control circuit 48 supplies power to the infrared lamps 17, 18 and 19 in furnace 15, causing heating of the gage sensor whose gage is to be calibrated.

Assuming that arm 35 is to the left of plate 36, as shown in the drawings, the position of needle 33 relative to needle 32 indicates that the temperature within the furnace is below the desired temperature. During these conditions heat is continued to be applied by the lamps 17–19 from the power control circuit 48.

The temperature within the furnace is detected by thermocouple 25, which controls the movement of arm 35 and needle 33 of the meter. As the temperature within the furnace increases, arm 35 moves to the right, as shown in the drawings, causing flag 39 to pass into the space between lamp 37 and light detector 38. When flag 39 has cut off the light between lamp 37 and light detector 38, transistor 53 ceases conducting causing lamp 54 to turn off. When lamp 54 turns off, resistor 71 increases in resistance, increasing the bias which is necessary to cause conduction of transistors 63 and 66, and causing SCRs 59 and 60 to conduct for a shorter period of time. If the power to the lamps is insufficient to maintain the desired temperature, arm 35 moves the flag to the left allowing a small amount of light to pass between lamp 37 and detector 38. Transistor 53 then conducts, allowing lamp 54 to illuminate detector 71 biasing the transistors 63 and 66 to conduct longer causing more power to be delivered to the lamps 17–19. Thus, the power to lamps 17, 18 and 19 is accurately maintained according to the desired temperature.

The temperature reading of the gage is then compared with that displayed by meter 27 and the gage may be suitably adjusted for any variations by well-known techniques.

The present invention presents apparatus for calibrating temperature gages such as steam gages for ships, and the calibration process by using the apparatus of the present invention is accurately controlled and performed in a matter of minutes.

Although the present invention is shown using PNP transistors and other semiconductor devices, it is understood that NPN transistors may be suitably substituted for PNP transistors, and that vacuum tubes, magnetic relays, and other suitable devices may be substituted for the semiconductor devices shown in the drawings.

This invention is not to be limited by the embodiment shown in the drawings and described in the description which is given by way of example and not of limitation, but only in accordance with the scope of the appended claims.

What is claimed is:

1. Apparatus for calibrating a temperature gage comprising a furnace adapted to receive a sensor of a temperature gage to be calibrated; heating means for heating said furnace; sensing means for sensing the temperature within said furnace; a meter connected to said sensing means, said meter having a movable needle controlled by said sensing means for indicating the temperature within said furnace; adjustable mounting means; position detecting means mounted on said mounting means for detecting a predetermined position of said needle relative to the position of said mounting means; a power control circuit for supplying electrical power to said heating means; a source of physical energy connected to said detecting means and controlled thereby; and bias means comprising a variable resistor connected in said power control circuit and mounted in a predetermined relation with said source of physical energy, said variable resistor having a resistance value responsive to physical energy provided by said source of physical energy for biasing said power control circuit, the resistance value of the variable resistor being continuously variable over a range and being dependent upon the quantity of said physical energy.

2. Apparatus according to claim 1 wherein said source of physical energy is a first source of illumination and said variable resistor is a first light detector responsive to illumination.

3. Apparatus according to claim 2 wherein said detecting means comprises a flag, a second source of illumination, a second light detector, mounting means for mounting said second source of illumination and said second light detector in a spaced relation, positioning means for selectively positioning said flag relative to said mounting means, and means coupled to said needle for changing the relative position of said flag and said mounting means upon a change in the temperature within the furnace whereby said flag reduces luminar intensity between said second source of illumination and said second light detector when said flag is in the space between said second source of illumination and said second light detector.

4. Apparatus according to claim 2 wherein said power control circuit comprises a pair of oppositely-poled controlled rectifiers connected in parallel, a first transistor for controlling one of said controlled rectifiers, a second transistor for controlling the other of said controlled rectifiers, a source of alternating current, a first diode for biasing said first transistor to conduction during one polarity of said alternating current, a second diode for biasing said second transistor to conduction during the other polarity of said alternating current, means connecting said first and second diodes to said first light detector, and means serially connecting said source of alternating current, said controlled rectifiers and said heating means.

5. Apparatus according to claim 4 wherein said control circuit is a phase-type power control circuit.

6. Apparatus according to claim 5 wherein said phase-type power control circuit comprises a pair of oppositely-poled controlled rectifiers connected in parallel, a first transistor for controlling one of said controlled rectifiers, a second transistor for controlling the other of said controlled rectifiers, a source of alternating current, a first diode for biasing said first transistor to conduction during one polarity of said alternating current, a second diode for biasing said second transistor to conduction during the other polarity of said alternating current, means connecting said first and second diodes to said first light detector, and means serially connecting said source of alternating current, said controlled rectifiers and said heating means.

References Cited

UNITED STATES PATENTS

| 2,733,387 | 1/1956 | Engelhard | 236—69 X |
| 2,765,986 | 10/1956 | Pompetti et al. | |
| 3,114,082 | 12/1963 | Weise. | |
| 3,155,814 | 11/1964 | Appleman et al. | 219—354 X |
| 3,327,517 | 6/1967 | Huffman. | |

LOUIS A. PRINCE, *Primary Examiner.*

D. M. YASICH, *Assistant Examiner.*

U.S. Cl. X.R.

73—1; 236—69